(12) United States Patent
Scott et al.

(10) Patent No.: US 7,718,139 B2
(45) Date of Patent: May 18, 2010

(54) PROCESS AND APPARATUS FOR OLEFIN POLYMERIZATION IN A FLUIDIZED BED REACTOR

(75) Inventors: Matthew Howard Scott, Longview, TX (US); Kenneth Alan Dooley, Longview, TX (US); Bailey James Salmon, Longview, TX (US); Mark Dewayne Lorenz, Longview, TX (US); Paul Keith Scherrer, Johnson City, TN (US); Robert Lin, Kingsport, TN (US); David Lynn Meade, Nickelsville, VA (US); Wayne Scott Strasser, Kingsport, TN (US); Dwayne Ray Leonard, Gray, TN (US)

(73) Assignee: Westlake Longview Corporation, Houston, TX (US)

( * ) Notice: Subject to any disclaimer, the term of this patent is extended or adjusted under 35 U.S.C. 154(b) by 853 days.

(21) Appl. No.: 11/490,216

(22) Filed: Jul. 20, 2006

(65) Prior Publication Data
US 2008/0021178 A1    Jan. 24, 2008

(51) Int. Cl.
*B01J 8/18* (2006.01)
*C08F 2/00* (2006.01)
(52) U.S. Cl. .......................... 422/139; 526/68; 526/69; 526/70; 526/72
(58) Field of Classification Search ................. 422/139; 526/68, 69, 70, 72
See application file for complete search history.

(56) References Cited

U.S. PATENT DOCUMENTS

| 4,640,963 | A | * | 2/1987 | Kreider et al. ................. 526/67 |
| 4,725,409 | A | * | 2/1988 | Wolf .......................... 422/145 |
| 4,882,400 | A |   | 11/1989 | Dumain et al. |
| 5,382,638 | A |   | 1/1995 | Bontemps et al. |
| 5,777,120 | A |   | 7/1998 | Jordan et al. |
| 5,866,663 | A |   | 2/1999 | Brookhart et al. |

FOREIGN PATENT DOCUMENTS

| FR | 2 137 441 | 12/1972 |
| FR | 2137441 A | 12/1972 |
| FR | DE 2124776 A1 * | 12/1972 |
| WO | WO 97/14721 | 4/1997 |
| WO | WO 9714721 * | 4/1997 |

OTHER PUBLICATIONS

Wang et al, Organometallics, 1998, vol. 17, pp. 3149-3151.
Small et al, Journal of the American Chemical Society, 1998, vol. 120, pp. 7143-7144.
Scollard et al, Journal of the American Chemical Society, 1996, vol. 118, pp. 10008-10009.
International Search Report and Accompanying Written Opinion issued in related International Patent Application No. PCT/US2007/015398 on Nov. 30, 2007.

* cited by examiner

*Primary Examiner*—William K Cheung
(74) *Attorney, Agent, or Firm*—Phan Law Group PLLC

(57) ABSTRACT

A process and apparatus for gas phase polymerization of olefins in a fluidized bed reactor are disclosed. The process and apparatus employ a vertically oriented fines ejector in order to reduce fouling and reactor downtime.

3 Claims, 3 Drawing Sheets

PROCESS AND APPARATUS FOR OLEFIN POLYMERIZATION IN A FLUIDIZED BED REACTOR

FIELD OF THE INVENTION

The invention generally relates to a process and apparatus for gas phase polymerization of olefins in a fluidized bed reactor. The process and apparatus employ a vertically oriented fines ejector in order to reduce fouling and reactor downtime.

BACKGROUND OF THE INVENTION

In a typical gas-phase, fluidized bed olefin polymerization process, fine polymer particles are carried overhead from the reactor and are removed from the recycle gas stream using cyclone or centrifugal separators. The collected fines are drawn from the bottom of the separator using an ejector and from there are returned to the reactor. Such a system is described in U.S. Pat. No. 4,882,400; the entire content of which is hereby incorporated by reference.

Ejectors currently in use and discussed specifically in the '400 patent have a horizontal design. A horizontally oriented fines ejector is shown in FIG. 1. In a typical horizontal fines ejector 10, a gas stream 11 enters the ejector 10 horizontally as shown in FIG. 1. The gas stream 11 provides a motive force to draw fines and gas 12 from the separator (not shown), incorporating them in the gas stream 11, and conveying them 13 to the reactor (not shown) into which they are subsequently re-injected.

In a continuous gas-phase, fluidized bed polyolefin polymerization process, it is common that gas loop piping and equipment would foul to the extent that a shutdown is periodically required for cleaning. Fouling is especially severe in the horizontal fines ejector 10 as the polymer powder-laden gas stream 12 from the fines separators (not shown) is forced to change direction, typically 90°, within the ejector 10. The powder and sometimes even sheets of polymer tend to build-up in area 14 and reduce the efficiency or even plug the ejector 10.

Fouling is so severe in the conventional-design ejector that cleaning to remove polymer build-up is required on average every two months, resulting in frequent plant shutdowns, excessive cleaning expenses, and unacceptable lost production. In extreme cases, heavy fouling of ejector internals will significantly impede ejector performance and has resulted in flow blockages and unplanned reactor shutdowns.

One of the aims of this invention, therefore, is to solve the problems associated with horizontal fines ejectors and extend the time between cleanings of the ejectors.

SUMMARY OF THE INVENTION

In one aspect, the invention provides a process for polymerizing olefins. The process comprises:
(a) contacting one or more olefins with a catalyst in a fluidized bed reactor under polymerization conditions to form an ascending gas stream comprising fine polymer particles and unreacted olefins;
(b) passing the ascending gas stream to a fines separator to separate the fine polymer particles from the unreacted olefins;
(c) passing the fine polymer particles from the fines separator to a vertically oriented fines ejector; and
(d) introducing a motive gas into the vertically oriented fines ejector to convey the fine polymer particles back to the fluidized bed reactor.

In another aspect, the invention provides an apparatus for polymerizing olefins. The apparatus comprises:
(a) a fluidized bed reactor for contacting one or more olefins with a catalyst under polymerization conditions to form an ascending gas stream comprising fine polymer particles and unreacted olefins;
(b) a fines separator in fluid communication with the fluidized bed reactor for separating the fine polymer particles from the unreacted olefins; and
(c) a vertically oriented fines ejector in fluid communication with the fines separator for conveying the fine polymer particles back to the fluidized bed reactor.

DETAILED DESCRIPTION OF THE INVENTION

Figure 1:
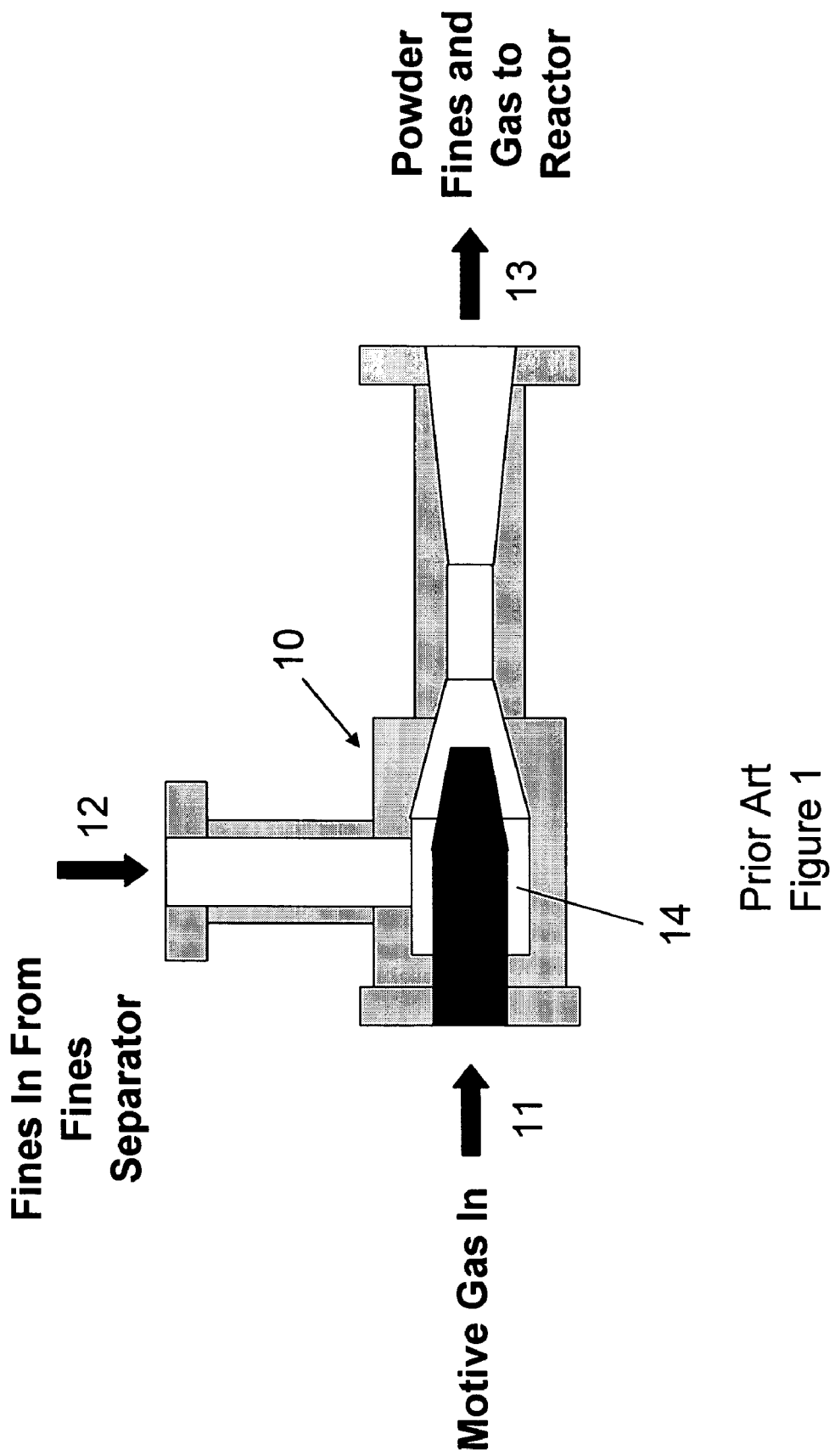
FIG. 1 is a cross-sectional view of a conventional horizontally oriented fines ejector.

In a first aspect, the invention provides a process for polymerizing olefins. The process comprises:
(a) contacting one or more olefins with a catalyst in a fluidized bed reactor under polymerization conditions to form an ascending gas stream comprising fine polymer particles and unreacted olefins;
(b) passing the ascending gas stream to a fines separator to separate the fine polymer particles from the unreacted olefins;
(c) passing the fine polymer particles from the fines separator to a vertically oriented fines ejector; and
(d) introducing a motive gas into the vertically oriented fines ejector to convey the fine polymer particles back to the fluidized bed reactor.

The olefins suitable for use in the invention include, for example, those containing from 2 to 16 carbon atoms. The olefins can be polymerized to form homopolymers, copolymers, terpolymers, and the like. Particularly preferred for preparation herein are polyethylenes. Such polyethylenes include homopolymers of ethylene and copolymers of ethylene and at least one alpha-olefin wherein the ethylene content is at least about 50% by weight of the total monomers involved. Exemplary alpha-olefins that may be utilized are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

In the present invention, any catalyst for polymerizing olefins may be used. Preferably the olefin polymerization catalyst comprises at least one metal selected from Groups 3, 4, 5, 6, 7, 8, 9, 10, 11, 12 and 13 of the Periodic Table of the Elements. Exemplary metals are titanium, zirconium, vanadium, iron, chromium, nickel and aluminum. The olefin polymerization catalyst may be neutral or cationic.

Exemplary of such polymerization catalysts are:

1. Any compound containing a Group 6 element. Preferred are chromium containing compounds. Exemplary are chromium oxide catalysts which polymerize ethylene to high molecular weight high density polyethylenes (HDPE) having a broad molecular weight distribution. These catalysts are typically based on Cr(6+) and are supported on a carrier. Further exemplary are organochromium catalysts such as bis(triphenylsilyl)chromate supported on silica and activated with organoaluminum compounds, and bis(cyclopentadienyl)chromium supported on silica.

2. Ziegler-Natta catalysts which typically contain a transition metal component and an organometallic co-catalyst such as an organoaluminum compound.

3. An olefin polymerization catalyst that polymerizes olefins to produce interpolymers of olefins having a molecular weight distribution (MWD) of from 1 to 2.5.

4. Metallocene catalysts which contain a transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and an organometallic co-catalyst that is typically alkyl aluminoxane, such as methyl aluminoxane, or an aryl substituted boron compound.

5. Any compound containing a Group 13 element. Preferred are aluminum containing compounds. Exemplary are catalysts of the type described in U.S. Pat. No. 5,777,120, such as cationic aluminum alkyl amidinate complexes with an organometallic co-catalyst that is typically alkylaluminoxane, such as methylaluminoxane, or an aryl substituted boron containing compound.

6. Any compound containing a Group 10 element. Preferred are nickel containing compounds. Exemplary are catalysts of the type described in U.S. Pat. No. 5,866,663, such as cationic nickel alkyl diimine complexes with an organometallic co-catalyst that is typically alkylaluminoxane, such as methylaluminoxane, or an aryl substituted boron containing compound. Further exemplary are catalysts of the type described in Organometallics, 1998, Volume 17, pages 3149-3151, such as neutral nickel alkyl salicylaldiminato complexes.

7. Any compound containing a Group 8 element. Preferred are iron containing compounds. Exemplary are catalysts of the type described in the Journal of the American Chemical Society, 1998, Volume 120, pages 7143-7144, such as cationic iron alkyl pyridinebisimine complexes with an organometallic co-catalyst that is typically alkylaluminoxane, such as methylaluminoxane, or an aryl substituted boron containing compound.

8. Any compound containing a Group 4 element. Preferred are titanium and zirconium containing compounds. Exemplary are catalysts of the type described in the Journal of the American Chemical Society, 1996, Volume 118, pages 10008-10009, such as cationic titanium alkyl diamide complexes with an organometallic co-catalyst that is typically alkylaluminoxane, such as methylaluminoxane, or an aryl substituted boron containing compound.

The above catalysts are, or can be, supported on inert porous particulate carriers, known in the art.

Any fluidized bed reactor for polymerizing olefins may be used in the process of the present invention. Typically, such a fluidized bed reactor comprises a reaction zone and a so-called velocity reduction zone. The reaction zone comprises a bed of growing polymer particles, formed polymer particles, and a minor amount of catalyst particles fluidized by a continuous flow of gaseous monomer and diluent to remove heat of polymerization from the reaction zone. A suitable rate of gas flow may be readily determined by simple experiment.

The polymerization is generally carried out at a pressure of about 0.5 to about 5 MPa, and at a temperature of from about 30° C. to about 150° C. The gas mixture passing through the fluidized bed polymerization reactor may contain, among the olefin(s) to be polymerized, dienes, hydrogen, and a gas that is inert towards the catalyst such as nitrogen, methane, ethane and/or propane. The gas mixture passes through the fluidized bed as a rising stream, with a fluidization velocity that is generally between 2 and 8 times the minimum fluidization velocity, e.g., between 0.2 and 0.8 m/s.

An ascending gas stream, which comprises entrained polymer particles and unreacted olefins, leaving the reaction zone is passed to the velocity reduction zone where entrained particles are removed. Finer entrained polymer particles and dust in the ascending gas stream are passed to a fines separator such as a cyclone and/or fine filter to separate the fine polymer particles from the unreacted olefins. The gas containing unreacted olefins from the fines separator can then be passed through a heat exchanger wherein the heat of polymerization is removed, compressed in a compressor, and then returned to the reaction zone in a recycle loop. Optionally, some of the recirculated gases may be cooled and compressed to form liquids that increase the heat removal capacity of the circulating gas stream when readmitted to the reaction zone.

According to the invention, the fine polymer particles separated from the unreacted olefins are passed to a vertically oriented fines ejector. A "vertically oriented fines ejector" refers to a fines ejector that does not force the stream of fines flowing through it to change direction, e.g., 90°. In preferred embodiment, the fines flow substantially vertically into the vertically oriented fines ejector and continue to flow substantially vertically upon exiting the ejector.

A motive gas is introduced into the vertically oriented fines ejector to convey the fine polymer particles back to the fluidized bed reactor. The motive gas may contain a gas that is inert towards the catalyst employed during the polymerization reaction, such as nitrogen. The motive gas may also contain the olefins that are introduced into the reactor. Preferably, a fraction of the gas from the recycle loop containing unreacted olefins that has been cooled and compressed is used as part of or all of the motive gas.

Bearing in mind the fact that the fine polymer particles reintroduced into the fluidized bed reactor can contain a high-activity catalyst, it is preferred to use a motive gas whose temperature is at least 15° C. lower than the polymerization temperature in the fluidized bed reactor. This is particularly preferred when the motive gas contains at least one olefin in order to avoid a premature polymerization reaction in the vertically oriented fines ejector or in the reintroduction pipework, which could cause blocking of the ejector or pipework.

Figure 2:
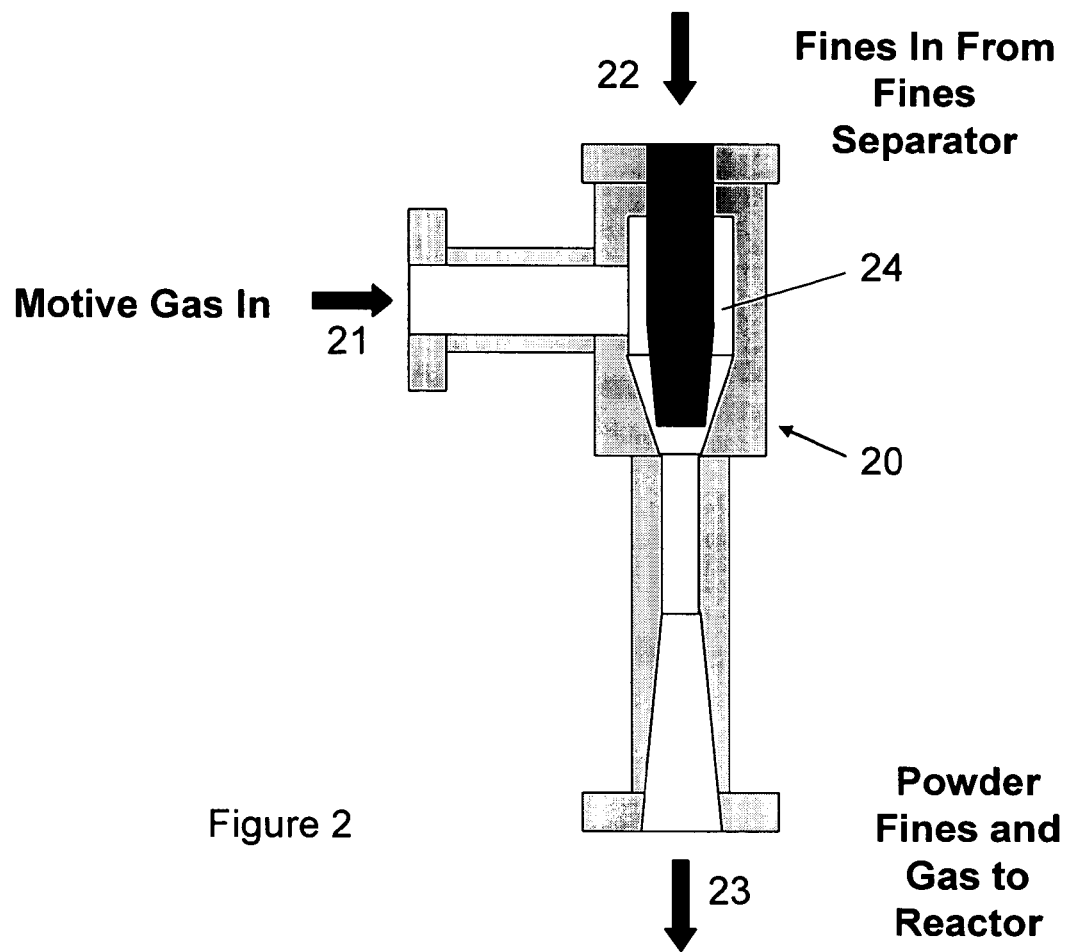
FIG. 2 is a cross-sectional view of a vertically oriented fines ejector according to the invention.

In one embodiment of the invention, the vertically oriented fines ejector has the configuration shown in FIG. 2. In FIG. 2, fine polymer particles and gas 22 exiting the fines separator (not shown) enter the vertically oriented fines ejector 20 in a substantially vertical direction. Motive gas 21 is introduced into the fines ejector 20 as an annular stream 24, which envelops the stream of fine polymer particles 22 entering the ejector 20 and propels the particles 23 in a substantially vertical direction back to the fluidized bed reactor. In ejector 20, both the entering fine polymer particles 22 and the exiting particles 23 travel in substantially the same general direction so that there is minimal or no internal surface area for the fine polymer particles to collect and build up in to cause unwanted fouling and plugging of the ejector 20. Additionally, since the powder-laden gas 22 entering the converging section of the ejector is conveyed in an annular envelop of the motive gas 24, there is minimal contact between the polymer particles and the ejector internal surfaces.

Figure 3:
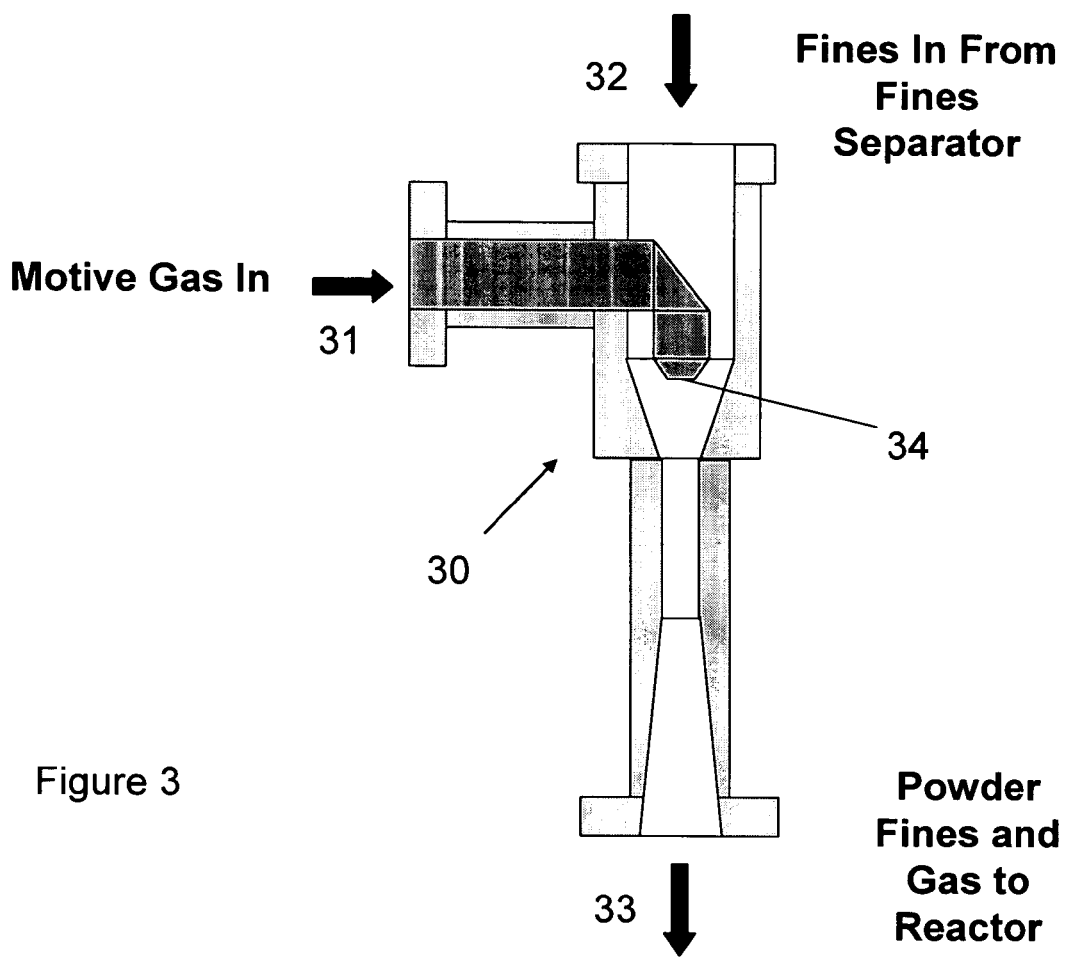
FIG. 3 is a cross-sectional view of another vertically oriented fines ejector according to the invention.

In another embodiment of the invention, the vertically oriented fines ejector has the configuration shown in FIG. 3. In FIG. 3, fine polymer particles and gas 32 exiting the fines separator (not shown) enter the vertically oriented fines ejector 30 in a substantially vertical direction. Motive gas 31 is introduced into the fines ejector 30 through nozzle 34 as a stream inside of the stream of flowing fine polymer particles 32 entering the ejector 30. The motive gas 31 propels the particles 33 in a substantially vertical direction back to the fluidized bed reactor. In ejector 30, both the entering fine polymer particles 32 and the exiting particles 33 travel in substantially the same general direction so that there is minimal or no area for the fine polymer particles to collect and build up in to cause unwanted fouling and plugging of the ejector 30.

The motive gas is supplied in an amount sufficient to provide the compression needed to pull streams 12, 22, or 32 from the fines separator and to deliver streams 13, 23, and 33 to the reactor. The precise amount depends on the particular process conditions and equipment employed, but may be determined by persons skilled in the art.

In a second aspect, the invention provides an apparatus for polymerizing olefins. The apparatus comprises:
(a) a fluidized bed reactor for contacting one or more olefins with a catalyst under polymerization conditions to form an ascending gas stream comprising fine polymer particles and unreacted olefins;
(b) a fines separator in fluid communication with the fluidized bed reactor for separating the fine polymer particles from the unreacted olefins; and
(c) a vertically oriented fines ejector in fluid communication with the fines separator for conveying the fine polymer particles back to the fluidized bed reactor.

The apparatus can further comprise a heat exchanger for cooling the unreacted olefins from the fines separator, a compressor for compressing the cooled unreacted olefins, and a conduit for recyling the cooled and compressed unreacted olefins back to the fluidized bed reactor.

The apparatus can also further comprise a conduit for conveying at least a portion of the cooled and compressed unreacted olefins to the vertically oriented fines ejector.

In one embodiment, as seen in FIG. 2, the vertically oriented fines ejector 20 comprises an annulus 24 for introducing an annular stream of a motive gas 21 around a stream of the fine polymer particles 22.

In another embodiment, as seen in FIG. 3, the vertically oriented fines ejector 30 comprises a nozzle 34 for introducing a motive gas 31 inside a stream of the fine polymer particles 32.

The invention has been described in detail with particular reference to preferred embodiments thereof, but it will be understood that variations and modifications can be effected within the spirit and scope of the invention.

We claim:
1. An apparatus for polymerizing olefins, comprising:
(a) a fluidized bed reactor for contacting one or more olefins with a catalyst under polymerization conditions to form an ascending gas stream comprising fine polymer particles and unreacted olefins;
(b) a fines separator in fluid communication with the fluidized bed reactor for separating the fine polymer particles from the unreacted olefins; and
(c) a vertically oriented fines ejector in fluid communication with the fines, separator for conveying the fine polymer particles back to the fluidized bed reactor
wherein the fine polymer particles flow substantially vertically into the vertically oriented fines ejector and continue to flow substantially vertically upon exiting the ejector, and
wherein the vertically oriented fines ejector comprises an annulus for introducing an annular stream of a motive gas around a stream of the fine polymer particles.

2. The apparatus according to claim 1, further comprising a heat exchanger for cooling the unreacted olefins from the fines separator, a compressor for compressing the cooled unreacted olefins, and a conduit for recyling the cooled and compressed unreacted olefins back to the fluidized bed reactor.

3. The apparatus according to claim 2, further comprising a conduit for conveying at least a portion of the cooled and compressed unreacted olefins to the vertically oriented fines ejector.

* * * * *